(12) United States Patent
Veilleux et al.

(10) Patent No.: US 9,272,499 B2
(45) Date of Patent: *Mar. 1, 2016

(54) STRUCTURAL GLAZING SPACER

(71) Applicant: SAINT-GOBAIN PERFORMANCE PLASTICS CORPORATION, Aurora, OH (US)

(72) Inventors: Thomas A. Veilleux, Webster, MA (US); James N. Gordon, Waban, MA (US); Stewart B. Dittmeier, Wells, VT (US)

(73) Assignee: SAINT-GOBAIN PERFORMANCE PLASTICS CORPORATION, Aurora, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,643

(22) Filed: Aug. 8, 2014

(65) Prior Publication Data

US 2014/0345782 A1 Nov. 27, 2014

Related U.S. Application Data

(63) Continuation of application No. 13/337,048, filed on Dec. 23, 2011, now Pat. No. 8,826,611.

(60) Provisional application No. 61/427,105, filed on Dec. 23, 2010.

(51) Int. Cl.
*E06B 3/54* (2006.01)
*B32B 37/12* (2006.01)
(Continued)

(52) U.S. Cl.
CPC .............. *B32B 37/1284* (2013.01); *B32B 5/18* (2013.01); *B32B 7/12* (2013.01); *B32B 37/02* (2013.01);
(Continued)

(58) Field of Classification Search
CPC ......... E06B 1/62; E06B 3/56; E06B 3/66342; E06B 3/66328; E06B 3/66366
USPC ............. 52/309.4, 789.13, 204.591–204.595, 52/204.62
See application file for complete search history.

(56) References Cited

U.S. PATENT DOCUMENTS 4,015,390 A 4/1977 Howorth
4,158,278 A 6/1979 Cardinale et al.
(Continued)

FOREIGN PATENT DOCUMENTS

CA 1072822 A2 3/1980
CA 2128369 A1 6/1995
(Continued)

OTHER PUBLICATIONS

International Search Report from PCT/U2011/06273 dated Jul. 30, 2012, 1 pg.
(Continued)

*Primary Examiner* — Elizabeth A Plummer
(74) *Attorney, Agent, or Firm* — Abel Law Group, LLP; Thomas Osborn

(57) ABSTRACT

A method of preparing a window module includes providing a metal frame having a first major surface, applying a structural glazing tape to the first major surface of the metal frame, and positioning a glass panel overtop the structural glazing tape. The structural glazing tape includes a polymer foam tape having first and second major surfaces, an adhesive layer overlying the first major surface for bonding the structural glazing tape to the structural frame, and a release layer overlying the second major surface. The method further includes filling a channel defined by the glass panel, the metal frame, and the structural glazing tape with a curable sealant, and curing the sealant to bond the glass panel and the metal frame together.

19 Claims, 4 Drawing Sheets

(51) Int. Cl.

| | | |
|---|---|---|
| *C03C 27/04* | (2006.01) | |
| *C09J 7/02* | (2006.01) | |
| *E06B 3/56* | (2006.01) | |
| *B32B 37/02* | (2006.01) | |
| *B32B 37/14* | (2006.01) | |
| *B32B 37/22* | (2006.01) | |
| *B32B 38/00* | (2006.01) | |
| *B32B 5/18* | (2006.01) | |
| *B32B 7/12* | (2006.01) | |

(52) U.S. Cl.
CPC .......... *B32B 37/144* (2013.01); *B32B 37/223* (2013.01); *B32B 38/00* (2013.01); *B32B 38/0008* (2013.01); *B32B 38/0036* (2013.01); *C03C 27/048* (2013.01); *C09J 7/0225* (2013.01); *C09J 7/0289* (2013.01); *E06B 3/5427* (2013.01); *E06B 3/56* (2013.01); *B32B 2038/0056* (2013.01); *B32B 2305/022* (2013.01); *B32B 2305/77* (2013.01); *B32B 2307/748* (2013.01); *B32B 2310/0409* (2013.01); *B32B 2310/0831* (2013.01); *B32B 2311/00* (2013.01); *B32B 2315/08* (2013.01); *B32B 2327/18* (2013.01); *B32B 2375/00* (2013.01); *B32B 2383/00* (2013.01); *B32B 2398/00* (2013.01); *B32B 2419/00* (2013.01); *Y10T 428/249983* (2015.04)

(56) References Cited

U.S. PATENT DOCUMENTS

| | | |
|---|---|---|
| 4,484,574 A | 11/1984 | DeRusha et al. |
| 4,552,790 A | 11/1985 | Francis |
| 4,633,631 A | 1/1987 | Crandell |
| 4,650,702 A | 3/1987 | Whitmyer |
| 4,675,232 A | 6/1987 | Edenbaum et al. |
| 4,950,344 A | 8/1990 | Glover et al. |
| 4,977,716 A | 12/1990 | Hawkins |
| 5,076,034 A | 12/1991 | Bandy |
| 5,086,777 A | 2/1992 | Hishii |
| 5,096,777 A | 3/1992 | Schacht et al. |
| 5,199,236 A | 4/1993 | Allen |
| 5,300,171 A | 4/1994 | Braun et al. |
| 5,355,645 A | 10/1994 | Farag |
| 5,465,539 A | 11/1995 | Rose |
| 5,490,358 A | 2/1996 | Grunewald et al. |
| 5,493,831 A | 2/1996 | Jansson |
| 5,494,715 A | 2/1996 | Glover |
| 5,545,700 A | 8/1996 | Mealey et al. |
| 5,603,789 A | 2/1997 | Whitmyer |
| 5,791,105 A | 8/1998 | Gangi |
| 5,807,632 A | 9/1998 | Pedginski et al. |
| 6,036,997 A | 3/2000 | Ragland et al. |
| 6,105,319 A | 8/2000 | Brunt |
| 6,158,372 A | 12/2000 | Erskine |
| 6,284,360 B1 | 9/2001 | Johnson et al. |
| 6,361,844 B1 | 3/2002 | Ou-Yang |
| 6,365,254 B1 | 4/2002 | Zoller et al. |
| 6,528,131 B1 | 3/2003 | Lafond |
| 6,546,692 B1 | 4/2003 | Duncan et al. |
| 6,864,322 B2 | 3/2005 | Gehlsen et al. |
| 6,919,405 B2 | 7/2005 | Kinning et al. |
| 7,540,119 B2 | 6/2009 | Milburn |
| 7,676,999 B2 | 3/2010 | Arias |
| 7,707,796 B2 | 5/2010 | Arias |
| 7,743,584 B2 | 6/2010 | Reichert et al. |
| 8,043,455 B2 | 10/2011 | Reichert |
| 8,141,324 B2 | 3/2012 | Carbary et al. |
| 8,302,364 B2 | 11/2012 | Hohmann, Jr. |
| 2003/0084622 A1 | 5/2003 | Hornung et al. |
| 2004/0043201 A1 | 3/2004 | Durand et al. |
| 2004/0194881 A1 | 10/2004 | Hung et al. |
| 2004/0260024 A1 | 12/2004 | Gehlsen et al. |
| 2006/0263596 A1 | 11/2006 | Bamborough et al. |
| 2007/0028538 A1 | 2/2007 | Woelfert |
| 2007/0032972 A1 | 2/2007 | Glover et al. |
| 2007/0082196 A1 | 4/2007 | Ali et al. |
| 2008/0168724 A1 | 7/2008 | Spannbauer et al. |
| 2009/0077921 A1 | 3/2009 | Carbary et al. |

FOREIGN PATENT DOCUMENTS

| | | |
|---|---|---|
| CH | 616203 A5 | 3/1980 |
| DE | 3701808 A1 | 6/1988 |
| DE | 3425740 C2 | 6/1989 |
| DE | 202004000457 U1 | 3/2004 |
| EP | 0399778 A1 | 11/1990 |
| EP | 0443900 A2 | 8/1991 |
| EP | 0244349 B1 | 11/1991 |
| EP | 0495150 A1 | 7/1992 |
| EP | 0395040 B1 | 12/1992 |
| EP | 0529546 A1 | 3/1993 |
| EP | 0388370 B1 | 11/1994 |
| EP | 0623727 A1 | 11/1994 |
| EP | 0641902 A1 | 3/1995 |
| EP | 0340473 B1 | 4/1995 |
| EP | 0623729 B1 | 8/1997 |
| EP | 0550841 B1 | 9/1997 |
| EP | 0628672 B1 | 9/1998 |
| EP | 1555377 A2 | 7/2005 |
| EP | 1578878 A1 | 9/2005 |
| FR | 2360735 A1 | 3/1978 |
| FR | 2638476 A1 | 5/1990 |
| FR | 2653856 A1 | 5/1991 |
| FR | 2654452 A1 | 5/1991 |
| FR | 2655076 A1 | 5/1991 |
| FR | 2657376 A1 | 7/1991 |
| FR | 2739406 A1 | 4/1997 |
| GB | 1510303 A | 5/1978 |
| GB | 1532299 A | 11/1978 |
| GB | 2143570 A | 2/1985 |
| GB | 2457900 A | 9/2009 |
| GB | 2459544 A | 11/2009 |
| IE | 20090383 A2 | 3/2010 |
| JP | H06158026 A | 6/1994 |
| JP | 2001059299 A | 3/2001 |
| JP | 2001-310422 A | 11/2001 |
| JP | 2003293659 A | 10/2003 |
| JP | 2008184824 A | 8/2008 |
| JP | 2009203793 A | 9/2009 |
| KR | 20-2000-0000517 U | 1/2000 |
| KR | 10-0993219 B1 | 11/2010 |
| WO | 93/16249 A1 | 8/1993 |
| WO | 97/14014 A1 | 4/1997 |
| WO | 2004/089617 A1 | 10/2004 |
| WO | 2007/011538 A2 | 1/2007 |
| WO | 2007/011540 A1 | 1/2007 |

OTHER PUBLICATIONS

International Search Report from PCT/US11/67294 dated Sep. 27, 2012, 1 pg.
International Search Report from PCT/US2011/067273 dated Jul. 30, 2012, 1 pg.

STRUCTURAL GLAZING SPACER

CROSS REFERENCE TO RELATED APPLICATION(S)

This application is a continuation and claims priority to U.S. patent application Ser. No. 13/337,048 filed Dec. 23, 2011, entitled "STRUCTURAL GLAZING SPACER," naming inventors Thomas A. Veilleux, James N. Gordon, and Stewart B. Dittmeier, which claims priority from U.S. Provisional Patent Application No. 61/427,105, filed Dec. 23, 2010, entitled "STRUCTURAL GLAZING SPACER," naming inventors Thomas A. Veilleux, James N. Gordon, and Stewart B. Dittmeier, of which both applications are incorporated by reference herein in their entirety.

FIELD OF THE DISCLOSURE

The present disclosure generally relates to a structural glazing spacer.

BACKGROUND

Structural glazing can allow for the production of a glass facade without framing elements separating the glass panels from one another. Glass panels are mounted on a respective concealed peripheral frame and then secured to the supporting structural framing. Sealing between adjacent glass panels and between the panels and the structural framing is performed by means of silicone sealant. The sealant can bond the glass panel to the structural framing to hold the glass in place.

Structural glazing systems make it possible to obtain continuous glazed facades in which the various glass panels are spaced from one another by very narrow gaps, having a width of the order of 15 mm, usually fully or partly occupied by a silicone sealant, which produces a regular checker-like partition among the glass panels.

Typically, the glass is positioned relative to the frame with a spacer, such as an extruded polymer or a foam tape. The spacer maintains a gap between the glass panel and the frame which can be filled with the silicone sealant to form a strong bond between the frame and the glass panel. The spacer remains within the module and can be visible through the glass. There is an ongoing need for improved spacers that can couple the desired aesthetic appearance and ease of installation.

SUMMARY

In a first aspect, a structural glazing tape can include a polymer foam tape, an adhesive layer overlying a first major surface of the polymer foam tape, and a release layer overlying a second major surface of the polymer foam tape. The structural glazing tape can be used as a spacer between a structural frame and a glass panel. The spacer can provide a space for a sealant to bond the structural frame and the glass panel together. The structural glazing tape can have a width in a range of about 3 mm to about 50 mm, such as about 6 mm to about 25 mm. In a particular embodiment, the structural glazing tape can be provided in the form of a roll, and the roll can be substantially free of a removable liner.

In an embodiment of the first aspect, the polymer foam tape can include a polyurethane foam, a polyvinyl chloride foam, a silicone foam, an ethylene propylene diene monomer rubber foam, an acrylic foam, a polychloroprene (Neoprene®) foam, a foam blend of EPDM rubber and polypropylene, such as Santoprene® foam, a polyethylene foam, an ethylvinyl acetate foam, or any combination thereof. The polymer foam can have a force to compress at 10% in a range of about 10 kPa to about 500 kPa, such as about 50 kPa to about 300 kPa. The polymer foam can have a thickness in a range of about 2 mm to about 12 mm.

In another embodiment of the first aspect, the adhesive can be a pressure sensitive adhesive, such as a rubber-based adhesive, an acrylic-based adhesive, a silicone-based adhesive, a silylated polyurethane, or any combination thereof. The adhesive layer can have a thickness in a range of about 0.01 mm to about 0.25 mm.

In yet another embodiment of the first aspect, the release layer can include a release agent, such as a silicone-based material, a fluorine-based material, a long-chain alkyl-based material, a fatty acid amide-based material, a polyvinyl alcohol-based material, a silica powder material, or any combination thereof. The release layer can have a thickness in a range of about 0.003 m to about 50 m.

In a particular embodiment, the structural glazing tape can also include a barrier layer, a UV/stabilizer layer, a colorant layer, or a combination thereof between the polymer foam and the release layer.

In still another embodiment of the first aspect, the structural glazing tape can also include a polymer film between the polymer foam and the release layer. The polymer film can include a polyethylene, a polyurethane, a polyacrylate, a polymethacrylate, a polyester, or any combination thereof. In a particular embodiment, the polymer film can include a polyethylene terephthalate. Additionally, the polymer film may include a pigment. In a particular embodiment, the structural glazing tape can also include a pigment layer between the polymer foam and the polymer film. The pigment layer can include a polymer and a pigment.

In a further embodiment of the first aspect, the structural glazing tape can have an Unwinding Peel Strength in a range of about 0.01 lb/in to about 2.5 lb/in, such as in a range of about 0.10 lb/in to about 1.5 lb/in. Further, the structural glazing tape can have a peel strength from a stainless steel panel in a range of about 1.0 lb/in to about 8.0 lb/in, such as in a range of about 2.0 lb/in to about 6.0 lb/in.

In a second aspect, a window module can include a metal frame, a glass panel, a structural glazing tape between a first major surface of the metal frame and a second major surface of the glass panel, and a cured sealant between the first major surface of the metal frame and the second major surface of the glass panel and adjacent to the structural glazing tape. The structural glazing tape can include a polymer foam tape, an adhesive layer overlying a first major surface of the polymer foam tape and a release layer overlying the second major surface of the polymer foam tape. The adhesive layer can bond the structural glazing tape to the first major surface of the structural frame, and the release layer can be positioned adjacent to the second major surface of the glass panel. The cured sealant can bond the metal frame to the glass panel.

In an embodiment of the second aspect, the glass panel can include one glass pane. In another embodiment, the glass panel can include an insulated glass including at least two glass panes. The metal frame can include an extruded aluminum. The sealant can include a silicone sealant.

In a third aspect, a method of preparing a window module can include providing a metal frame having a first major surface, applying a structural glazing tape to the first major surface of the metal frame, and positioning a glass panel on the structural glazing tape. The structural glazing tape can include a polymer foam tape, an adhesive layer overlying a first major surface of the polymer foam tape, and a release layer overlying a second major surface of the polymer foam tape. The adhesive layer can bond the structural glazing tape to the structural frame. The method can further include filling a space with a curable sealant, and curing the sealant to bond the glass panel and the metal frame together. The space can be defined by the glass panel, the metal frame, and the structural glazing tape.

In an embodiment of the third aspect, the glass panel can include one glass pane. In another embodiment, the glass panel can include an insulated glass including at least two glass panes. The metal frame an include an extruded aluminum. The sealant can include a silicone sealant.

In another embodiment of the third aspect, curing the sealant can include heating the sealant to a cure temperature, reacting the sealant with moisture in the air, directing electromagnetic radiation at the sealant, or any combination thereof. The electromagnetic radiation can include ultraviolet radiation.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an embodiment, a structural glazing tape can be used as a temporary assembly aid to create a space between a metal frame and a glass panel. The space can be suitable for applying a sealing to bond the glass panel to the metal frame. The structural glazing tape can have an adhesive on one side for bonding to the metal frame and a release layer on the other side. The release layer can substantially prevent the structural glazing tape from bonding to itself without the use of a liner when supplied in a roll.

Figure 1:
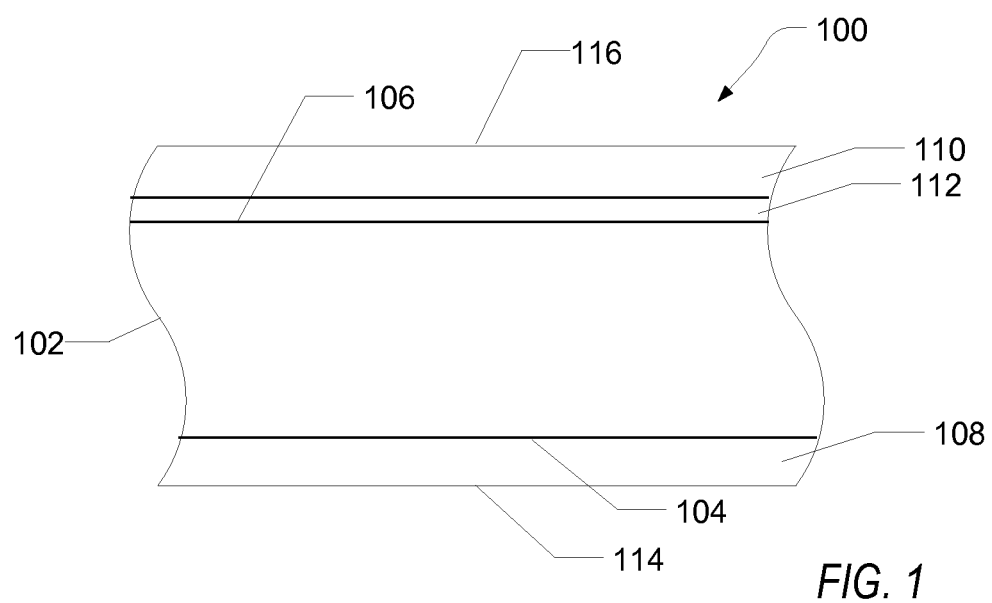
FIGS. 1 through 3 show cross sections of exemplary structural glazing tapes according to aspects of the present disclosure.

FIG. 1 illustrates a cross-sectional view of an exemplary structural glazing tape 100. The structural glazing tape 100 can include a polymer foam 102. The polymer foam 102 can have major surfaces 104 and 106. Further, the structural glazing tape 100 can include an adhesive layer 108 overlying major surface 104 and a release layer 110 overlying major surface 106. The structural glazing tape 100 can include a barrier layer 112 between the polymer foam 102 and the release layer 110. The barrier layer can include a polymer resistant to solvents and substantially reduces or substantially prevents migration of chemicals and solvents present in the release layer 110 into polymer foam 102. The structural glazing tape 100 can further include other layers, films, or coatings (not illustrated in FIG. 1) as well. For example, the structural glazing tape 100 can further include a polymer layer, a colorant layer, U/V stabilizer layer, or a combination thereof (not illustrated in FIG. 1). The colorant layer can include a polymer and a pigment to impart and maintain an aesthetically pleasing color to the structural glazing tape 100. Additionally, a pigment in the colorant layer can substantially prevent or attenuate color changes in the polymer foam 102 due to aging, or hide color changes.

The polymer foam 102 can include a polyurethane foam, a polyvinyl chloride foam, a silicone foam, an ethylene propylene diene monomer (EPDM) rubber foam, an acrylic foam, a polychloroprene foam, polychloroprene foam, a foam blend of EPDM rubber and polypropylene, a polyethylene foam, a ethylvinyl acetate foam, or any combination thereof. The polymer foam 102 can provide a sufficient thickness to create a space between a metal frame and a glass panel so that a sealant can be applied to bond the metal frame and the glass panel together. In an exemplary embodiment, the polymer foam can have a thickness in a range of about 2 mm to about 12 mm.

Additionally, the polymer foam 102 can be partially compressible to enable the structural glazing tape to conform to the surfaces of the metal frame and the glass panel while still maintaining sufficient space between the glass panel and the metal frame for the sealant. In an exemplary embodiment, the polymer foam can have a force to compress at 10% in a range of about 10 kPa to about 500 kPa, such as about 50 kPa to about 300 kPa.

The adhesive layer 108 can include an adhesive, such as a pressure sensitive adhesive. The pressure sensitive adhesive can include a rubber-based adhesive, an acrylic-based adhesive, a silicone-based adhesive, a silylated polyurethane, combinations thereof, and the like. The adhesive layer 108 can provide sufficient adhesion to hold the structural glazing tape 100 in place during positioning of the glass panel as well as during application and curing of the sealant. In an exemplary embodiment, the adhesive layer can have a thickness in a range of about 0.01 mm to about 0.25 mm.

The adhesive polymer may further include additives to impart particular properties on the adhesive polymer. For instance, pigments, fillers, catalyst, plasticizer, biocide, flame retardant, antioxidant, surfactant, tackifiers, adhesion promoting additives, and the like may be added. Exemplary pigments include organic and inorganic pigments. Suitable fillers include, for instance, silica, precipitated silica, talc, calcium carbonates, aluminasilicates, clay, zeolites, ceramics, mica, aluminium or magnesium oxide, quartz, diatomaceous earth, thermal silica, also called pyrogenic silica, and nonpyrogenic silica. The fillers may also be silicates such as talc, mica, kaolin, glass microspheres, or other mineral powders such as calcium carbonate, mineral fibers, or any combination thereof. Exemplary plasticizers include paraffinic oils, naphthenic oils, low molecular weight poly-1-butene, low molecular weight polyisobutene, and combinations thereof. In a particular embodiment, the foamed polymer includes adhesion promoting additives such as functional silanes or other adhesion promoters. Exemplary silanes include 3-aminopropyltrimethoxy silane, 3-(trimethoxysilyl) propyl methacrylate, 3-glycidoxypropyltrimethoxy silane, and n-ocryltrimethoxy silane. The adhesion promoter may optionally be used in an amount of about 0.0001% to about 5.0%, for example from about 0.01% to about 2.0% by weight of polymer.

The release layer 110 can include a composition immiscible with the pressure sensitive adhesive. The release layer 110 can be in direct contact with the adhesive layer 108 when the structural glazing tape 100 is provided in a roll, and the release layer 110 can be easily separated from the adhesive layer 108. As such, the release layer 110 can substantially eliminate the need for a liner to be placed over the adhesive layer 108 that would otherwise need to be removed when applying the structural glazing tape 100 to the metal frame. The release agent may include a colorant or a U/V stabilizer.

For example, the release layer 110 can include a release agent, silicone-based material, a fluorine-based material, a long-chain alkyl-based material, a fatty acid amide-based material, a polyvinyl alcohol-based material, a silica powder material, or any combination thereof. An example release agent is a silicone-based release agent, such as an addition-curable and condensation curable silicone. In this type of release material, a platinum (Pt) or rhodium (Rh) catalyst is used in general as the curing catalyst for the release agent. In an embodiment, the fluorine-based material can include fluoropolymers. In one particular embodiment, the fluorine-based material can include polytetrafluoroethylene (PTFE).

Alternatively, the release layer 110 can be formed of greases or oils that maintain some viscosity. For example, the release material can include a silicone grease, a fluorosilicone oil, a phenylsilicone oil, a paraffin wax, or any combination thereof.

The release layer 110 can further be formed from an aqueous precursor. The aqueous precursor includes the release agent in an aqueous medium. The release layer 110 is then formed by applying the aqueous precursor onto the surface underlying the release layer followed by dehydration of the precursor. Optionally, curing can follow the dehydration. After dehydration or curing, the release layer is formed.

Alternatively, the release layer 110 can be formed from an non-aqueous precursor. The non-aqueous precursor includes the release agent in a non-aqueous solvent. Solvents can include methyl ethyl ketone, isopropyl alcohol, acetone, toluene, methyl isobutyl ketone, or any combination thereof. The release layer 110 is then formed by applying the non-aqueous precursor onto the surface underlying the release layer followed by removal of the non-aqueous solvent. Optionally, curing can follow the removal of the solvent. After solvent removal or curing, the release layer is formed.

In an exemplary embodiment, the release layer can have a thickness in a range of about 0.003 m to about 50 m.

The release layer may also include a filler, such as a solid lubricant, a ceramic or mineral filler, a polymer filler, a fiber filler, a metal particulate filler or salts or any combination thereof. An exemplary solid lubricant includes polytetrafluoroethylene or a solid lubricant selected from molybdenum disulfide, tungsten disulfide, graphite, graphene, expanded graphite, boron nitride, talc, calcium fluoride, cerium fluoride, or any combination thereof. An exemplary ceramic or mineral includes alumina, silica, titanium dioxide, calcium fluoride, boron nitride, mica, Wollastonite, silicon carbide, silicon nitride, zirconia, carbon black, pigments, or any combination thereof. An exemplary polymer filler includes polyimide, Ekonol® polyester, polybenzimidazole, any of the thermoplastic polymers listed above, or any combination thereof. An exemplary fiber includes nylon fibers, glass fibers, carbon fibers, polyacrylonitrile fibers, polyaramid fibers, polytetrafluoroethylene fibers, basalt fibers, graphite fibers, ceramic fibers, or any combination thereof. Exemplary metals include bronze, copper, stainless steel, or any combination thereof. An exemplary salt includes a sulfate, a sulfide, a phosphate, or any combination thereof.

In a particular embodiment, the release agent can be chosen to minimize undesirable optical effects when the release agent is in contact with the glass. Additionally, an exposed surface of the release layer can be textured or fillers can be incorporated into the release layer to further reduce the optical effects.

Figure 2:
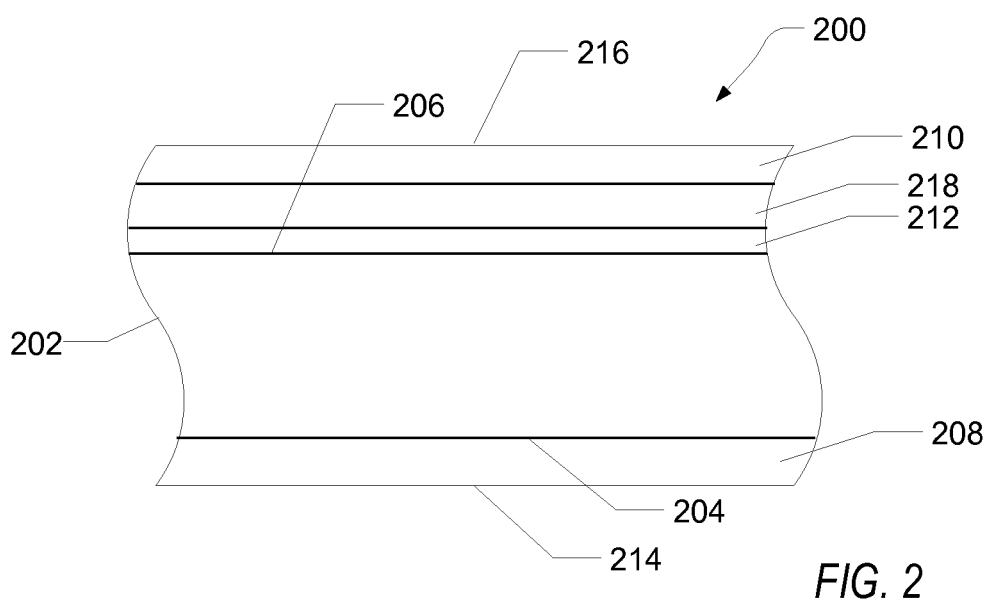

FIG. 2 illustrates a cross-sectional view of another exemplary structural glazing tape 200. The structural glazing tape 200 can include a polymer foam 202. The polymer foam 202 can have major surfaces 204 and 206. Further, the structural glazing tape 200 can include an adhesive layer 208 overlying major surface 204. A polymer film 218 can overlie major surface 206. Additionally, a release layer 210 can overlie the polymer film 218. Optionally, the structural glazing tape 200 can include a colorant layer 212 between the polymer foam 202 and the polymer film 218. In an alternate embodiment (not illustrated in FIG. 2), the colorant layer can be between release layer 210 and polymer film 218.

Polymer film 218 can include a polymer, such as a polyethylene, a polyurethane, a polyacrylate, a polymethacrylate, a polyester, or any combination thereof. In a particular embodiment, the polymer can include a polyethylene terephthalate (PET). The polymer film can include a pigment or a U/V stabilizer. The pigment can serve to substantially prevent color changes due to aging of the polymer foam 202 from being visible. Alternatively, the polymer film can be substantially transparent, and the optional colorant layer 212 can substantially obscure color changes in the polymer foam 202. Optionally, there can be an additional adhesive layer between the polymer foam 202 and the polymer film 218. The additional adhesive layer can include an adhesive suitable for increasing the adhesion between the polymer film 218 and the polymer foam 202. The additional adhesive layer can be combined with the colorant layer 212, such as by adding a pigment as a filler to the additional adhesive layer, or the additional adhesive layer can be separate from the optional colorant layer 212.

In an embodiment, the tape can be provided in a roll such that the tape can be unwound from the roll without undue force. For example, the tape can have an Unwinding Peel Strength in a range of about 0.01 lb/in to about 2.0 lb/in, such as about 0.01 lb/in to about 1.0 lb/in, or in a range of about 0.10 lb/in to about 0.5 lb/in, measured according to the force required to remove the tape directly from the roll. The Unwinding Peel Strength can be determined by measuring "T" Peel Strength at a rate of 40 inches/min according to ASTM D1876. Additionally, after removal from the roll, the tape should have sufficient adhesive strength to adhere to a surface, such as a metal frame. For example, the tape can have a peel strength from a stainless steel panel in a range of about 1.0 lb/in to about 8.0 lb/in, such as in a range of about 2.0 lb/in to about 6.0 lb/in. The peel strength from a stainless steel panel can be determined by measuring the 90-degree peel strength at 12 inches/min according to ASTM D1000-99, using a segment of tape unwound from the roll and laminated onto stainless steel panel.

Figure 3:
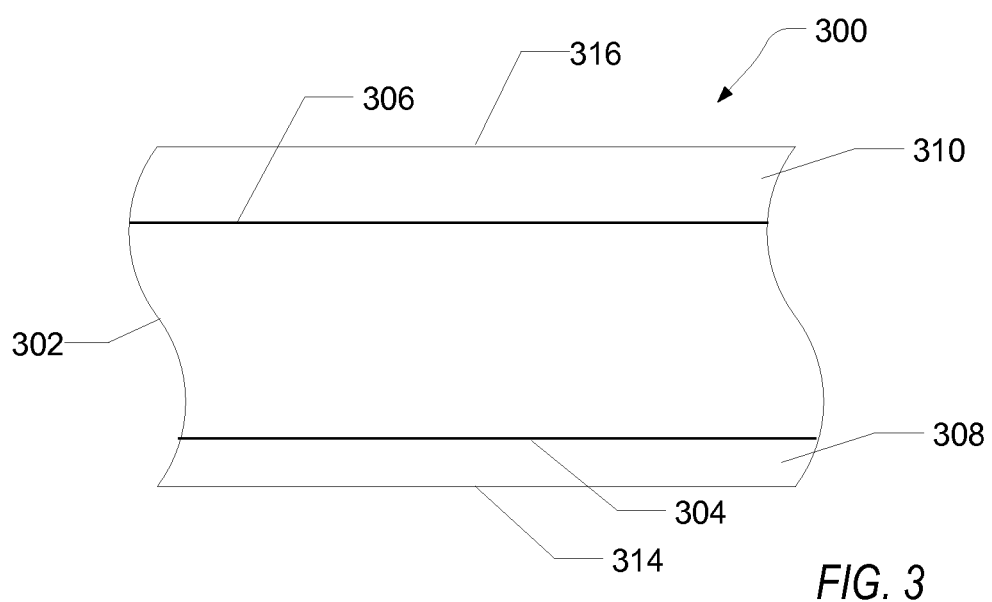

FIG. 3 illustrates a cross-sectional view of an exemplary structural glazing tape 300. The structural glazing tape 300 can include a polymer foam 302. The polymer foam 302 can have major surfaces 304 and 306. Further, the structural glazing tape 300 can include an adhesive layer 308 overlying major surface 304 and a release layer 310 overlying major surface 306. Optionally, the structural glazing tape 300 can include additional layers or a coating between the polymer foam 302 and the release layer 310. The additional layer or coating can include a polymer to impart a barrier between the polymer foam 302 and the release layer 310. In another embodiment, the additional layer or coating can include a polymer including a colorant or pigment to impart aesthetically pleasing color to the structural glazing tape 300. Additionally, the pigment layer can substantially prevent color changes in the polymer foam 302 due to aging from being visible.

The polymer foam 302 can include foamed polymers, dimensions, and properties as described for polymer foam 102 in FIG. 1. The adhesive layer 308 can include compounds, dimensions, and properties as described for adhesive layer 108 in FIG. 1.

The release layer 310 can include a composition immiscible with the pressure sensitive adhesive. The release layer 310 can be in direct contact with the adhesive layer 308 when the structural glazing tape 300 is provided in a roll, and at least a portion of the release layer 310 can be easily separated from the adhesive layer 308. As such, the release layer 310 can substantially eliminate the need for a liner to be placed over the adhesive layer 308 that would otherwise need to be removed when applying the structural glazing tape 300 to the metal frame. Moreover, the release layer 310 becomes a permanent component of glazing tape 300 when placed between a frame and glass panel as further described herein.

For example, the release layer 310 can include a release agent, silicone-based material, a fluorine-based material, a long-chain alkyl-based material, a fatty acid amide-based material, a polyvinyl alcohol-based material, a silica powder material, or any combination thereof. An example release agent is a silicone-based release agent, such as an addition-curable and condensation curable silicone. In this type of release material, a platinum (Pt) or rhodium (Rh) catalyst is used in general as the curing catalyst for the release agent.

Alternatively, the release layer 310 can be formed of greases or oils that maintain some viscosity. For example, the release material can include a silicone grease, a fluorosilicone oil, a phenylsilicone oil, a paraffin wax, or any combination thereof. Moreover, the release layer can include a solvent to modify viscosity. For release layers including a solvent, an additional barrier layer between can be present between release layer 310 and polymer foam 302 to substantially prevent migration of solvent from the release layer 310 into the polymer foam 302. The barrier layer can include a water-based polyurethane polymer. In another embodiment, the barrier layer can include an acrylic polymer, or a wax.

In an exemplary embodiment, the release layer can have a thickness in a range of about 0.003 m to about 50 m. In another embodiment, the release layer has a thickness of at least 0.3 µm.

The release layer 310 may also include a filler, such as a solid lubricant, a ceramic or mineral filler, a polymer filler, a fiber filler, a metal particulate filler or salts or any combination thereof. An exemplary solid lubricant includes polytetrafluoroethylene or a solid lubricant selected from molybdenum disulfide, tungsten disulfide, graphite, graphene, expanded graphite, boron nitride, talc, calcium fluoride, cerium fluoride, or any combination thereof. An exemplary ceramic or mineral includes alumina, silica, titanium dioxide, calcium fluoride, boron nitride, mica, Wollastonite, silicon carbide, silicon nitride, zirconia, carbon black, pigments, or any combination thereof. An exemplary polymer filler includes polyimide, Ekonol® polyester, polybenzimidazole, any of the thermoplastic polymers listed above, or any combination thereof. An exemplary fiber includes nylon fibers, glass fibers, carbon fibers, polyacrylonitrile fibers, polyaramid fibers, polytetrafluoroethylene fibers, basalt fibers, graphite fibers, ceramic fibers, or any combination thereof. Exemplary metals include bronze, copper, stainless steel, or any combination thereof. An exemplary salt includes a sulfate, a sulfide, a phosphate, or any combination thereof.

In a particular embodiment, the release agent can be chosen to minimize undesirable optical effects when the release agent is in contact with the glass. Additionally, an exposed surface of the release layer can be textured or fillers can be incorporated into the release layer to further reduce the optical effects.

Figure 4:
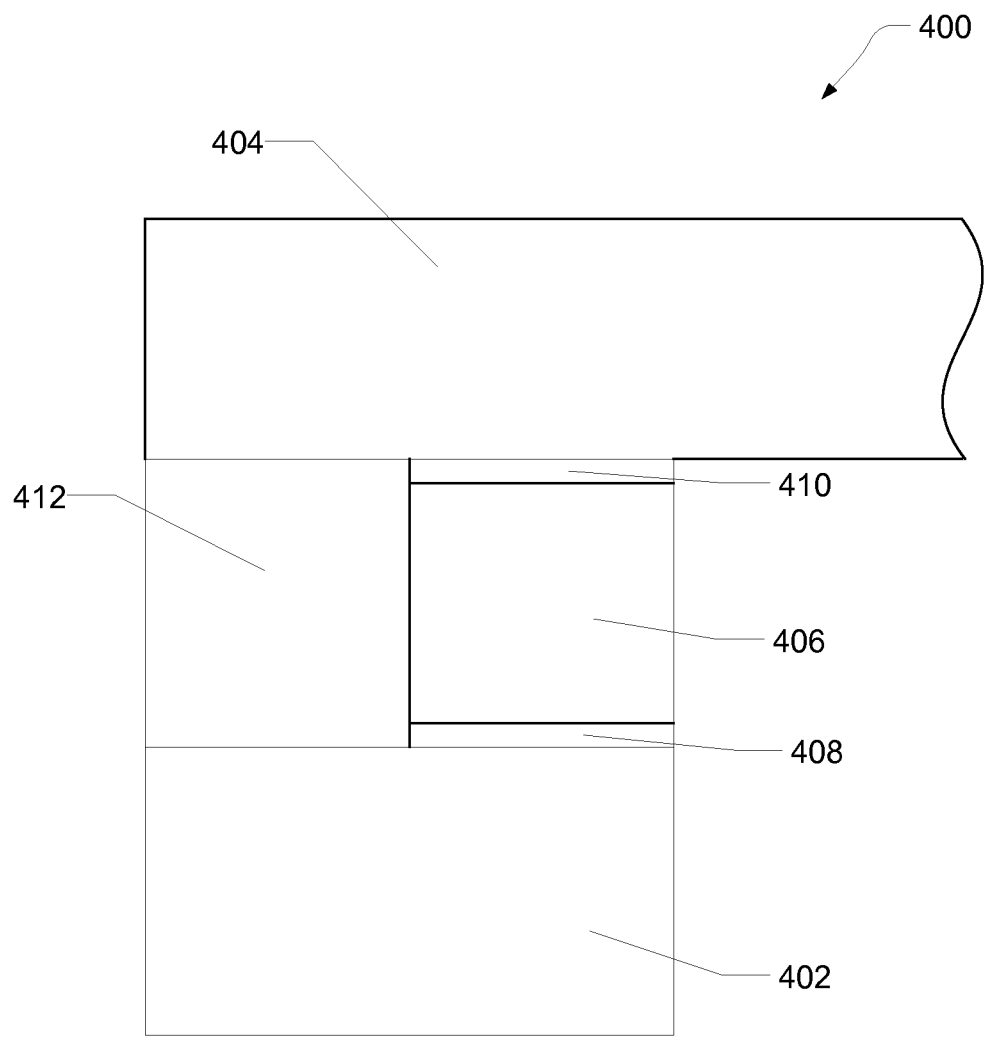
FIGS. 4 and 5 show a cross section of exemplary window modules according to aspects of the present disclosure.

FIG. 4 illustrates a cross sectional view of an exemplary structural module 400. Structural module 400 can include a frame 402 and a glass panel 404. Between the frame 402 and the glass panel 404 can be a spacer 406, such as structural glazing tape 100, 200, or 300. The spacer 406 can include an adhesive 408 adjacent to the frame 402 to bond the spacer 406 to the frame 402. Additionally, the spacer 406 can include a release layer 410. The release layer 410 can be adjacent to the glass panel 404 when assembled within the module 400. Additionally, the structural module 400 can include a sealant 412 to bond the glass panel 404 to the frame 402. As can be seen in FIG. 4, the release layer is integrated into the structural glazing tape when the tape is deployed into a window module 400 between the frame 402 and the glass panel 404. Alternatively stated, the release layer 410 is a permanent, non-removable feature of the structural glazing tape that is directly or indirectly bonded to the polymer foam from the tape, unlike a releasable liner, which is removed prior to deployment. As should be clear, various embodiments herein are directed to self-wound tapes, having a liner-free construction and an integrated release layer in the structural glazing tape.

The frame 402 can include a metal, a polymer, or any combination thereof. In a particular embodiment, the frame can be an extruded metal or polymer. The frame 402 can provide support for the glass panel 404 and can serve as an attachment point to the structural framing of a building or other structure.

The glass panel 404 can include one or more panes of glass. In a particular embodiment, the glass panel can be a single pane glass. Alternatively, the glass panel can include two or more panes and can be an insulated glass, further serving to reduce heat flow between an exterior of the structural module 400 and the interior of the structural module 400.

The sealant 412 can include a curable polymer. In an embodiment, the curable polymer can be a moisture-cured polymer, a thermally-cured polymer, or a radiation-cured polymer. For example, curing of a moisture cured polymer can be initiated by exposure to moisture in the air. In another example, curing of a thermally-cured polymer can be initiated by heating the polymer to a curing temperature, and curing of a radiation-cured polymer can be initiated by exposing the polymer to electromagnetic radiation, such as ultra-violet (UV) radiation. In an embodiment, the curable polymer can be a silicone polymer.

After curing, the curable polymer can serve to bond the glass panel and the frame together. The adhesion of the curable polymer can be sufficient to substantially prevent the glass panel from moving relative to the frame even when the structural module is placed in a vertical position and the weight of the glass panel produces a sheering force between the glass panel and the frame. Additionally, the sealant can substantially prevent environmental elements, such as air, water, and dust, from penetrating the structural module and passing either from an interior to exterior space or from an exterior to interior space.

Figure 5:
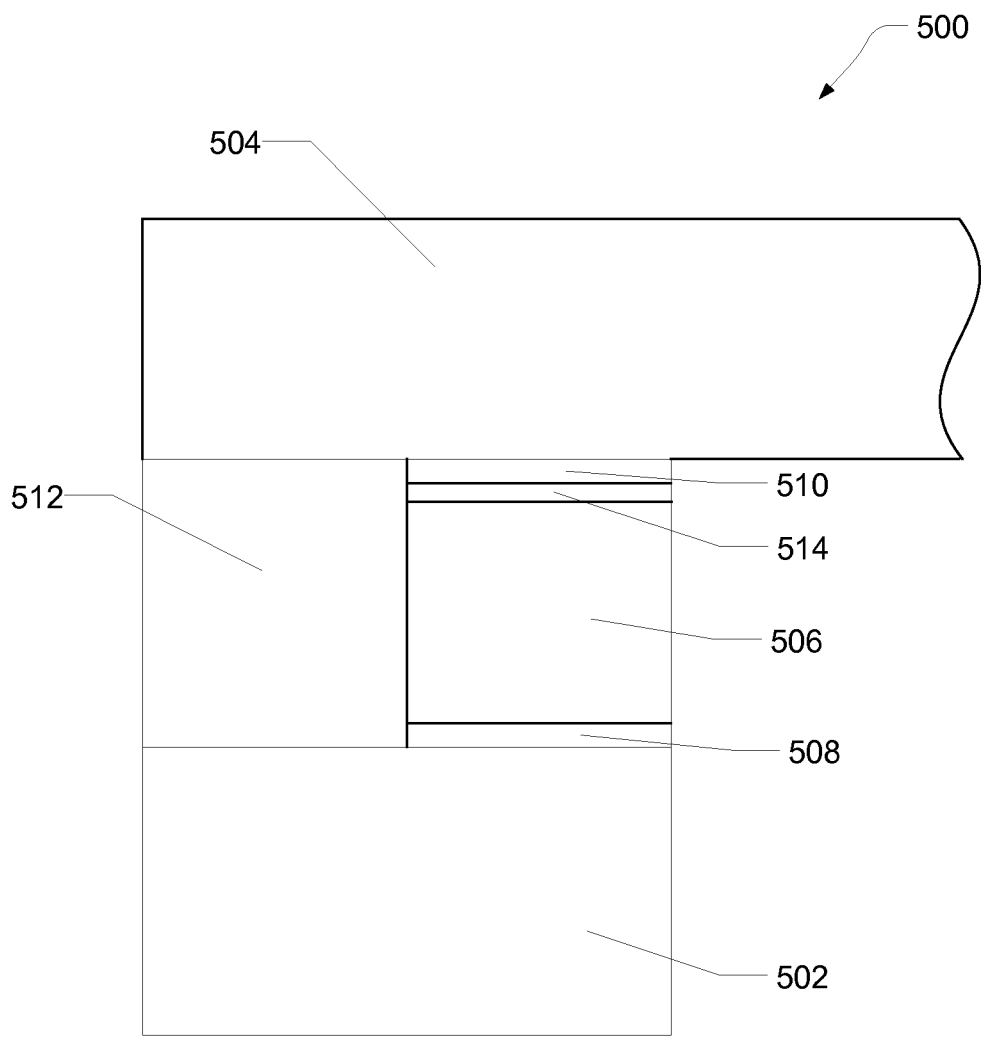

FIG. 5 illustrates a cross sectional view of another exemplary structural module 500. Structural module 500 can include a frame 502 and a glass panel 504. Between the frame 502 and the glass panel 504 can be a spacer 506, such as structural glazing tape 100, 200, or 300. The spacer 506 can include an adhesive 508 adjacent to the frame 402 to bond the spacer 506 to the frame 502. Additionally, the spacer 506 can include a barrier layer 514 and a release layer 510. The release layer 510 can be adjacent to the glass panel 504 when assembled within the module 500. The barrier layer 514 can be between spacer 506 and release layer 510. Additionally, the structural module 500 can include a sealant 512 to bond the glass panel 504 to the frame 502.

The frame 502 can include materials as described for frame 402 in FIG. 4. The glass panel 504 can include one or more panes of glass as described for glass panel 404 in FIG. 4. The sealant 512 can include materials as described for sealant 412 in FIG. 4.

The barrier layer 514 protects spacer 506 from solvents and or liquids that are included in release layer 510. As described above, solvents may be present in release layers 210 or 110. When solvents or liquids are present in the release layers, a barrier layer, such as barrier layer 112 in FIG. 1, becomes in the window module barrier layer 514 which is placed underneath release layer 510. The barrier layer 514 substantially reduces or substantially prevents migration of chemicals or solvents present in release layer 510 into spacer 506. The barrier layer 514 can include materials such as described for layer 112 in glazing tape 100.

Turning to the method of forming the structural glazing tape, a release agent can be applied to a support to form a release layer. In a particular embodiment, an optional colorant layer can be applied overlying the release layer. Additionally, a polymer foam precursor can be mixed with a foaming agent and then spread onto the support overlying the release layer and optionally, the colorant layer. The polymer foam precursor can be cured to form a polymer foam, and an adhesive layer can be applied overlying the polymer foam. In an embodiment, the foam can be cut to form a tape including the release layer, the foam, and the adhesive, and the tape can be rolled onto a roll without interleaving a liner between wrappings of the tape. Rather, the release layer can serve to substantially prevent the adhesive layer from sticking to the previous wrapping of the tape.

In another embodiment, the polymer foam precursor can be mixed with a foaming agent and spread onto a polymer film, such as a PET film. The polymer film can include a release coat on the side opposite of the polymer foam precursor. The polymer film can be a colored film or a clear film. In a particular embodiment, the clear film can be coated with an optional colorant layer prior to spreading the polymer foam precursor. The polymer foam precursor can be cured to form a polymer foam and coated with an adhesive. The structure can be cut to a desired size, such as a tape having a width of between about and about 3 mm to about 50 mm. Additionally, the tape can be rolled onto a roll without interleaving a liner between wrappings of the tape.

In a further embodiment, an additional adhesive layer can be located between the polymer foam and the polymer film to increase adhesion between the polymer foam and the polymer film. For example, the adhesive can be applied to a PET film and the polymer foam precursor can be applied overtop the adhesive. Alternatively, the PET film can be bonded to the polymer foam with the polymer foam after forming the polymer foam.

Turning to the method of assembling the structural module, a frame can be assembled. The frame can include an extruded aluminum. A structural glazing tape can be applied to a surface of the frame, such that the structural glazing tape only covers a portion of the surface. The structural glazing tape can be applied such that an adhesive layer of the structural glazing tape adheres to the frame. A glass panel can be applied overtop the structural glazing tape. A release layer of the structural glazing tape can be in contact with a surface of the glass panel. Due to the lack of adhesion between the release layer and the glass panel, the position of the glass panel can be adjusted as needed. The glass panel, the structural glazing tape, and the surface of the frame can define a channel. Depending on the initial positioning of the structural glazing tape on the frame, the channel can be interior of the structural glazing tape or exterior to the structural glazing tape. A sealant, such as a silicone sealant, can be applied to fill the channel. Additionally, the sealant can be cured, such as by applying heat, electromagnetic radiation, or moisture to the sealant. Upon curing the sealant can bond the glass panel to the frame.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

A structural glazing tape can be for use as a spacer between a structural frame and a glass panel to provide a space for a sealant to bond the structural frame and the glass panel together. The structural glazing tape can include a polymer foam tape having first and second major surfaces, an adhesive layer overlying the first major surface for bonding the structural glazing tape to the structural frame, and a release layer overlying the second major surface. The release layer can be integrated into the structural glazing tape such that the release layer is present between the structural frame and the glass panel when deployed.

A structural glazing tape for use as a spacer between a structural frame and a glass panel to provide a space for a sealant to bond the structural frame and the glass panel together can include a polymer foam tape having first and second major surfaces, an adhesive layer overlying the first major surface for bonding the structural glazing tape to the structural frame, and a release layer overlying the second major surface. The release layer can substantially prevents the structural glazing tape from bonding to itself. The structural glazing tape can be free of a liner.

In one embodiment, the polymer foam tape can include a polyurethane foam, a polyvinyl chloride foam, a silicone foam, an ethylene propylene diene monomer rubber foam, an acrylic foam, a polychloroprene foam, a foam blend of EPDM rubber and polypropylene, a polyethylene foam, an ethylvinyl acetate foam, or any combination thereof. In another embodiment, the adhesive is a pressure sensitive adhesive. The pressure sensitive adhesive includes a rubber-based adhesive, an acrylic-based adhesive, a silicone-based adhesive, a silylated polyurethane, or any combination thereof.

In one embodiment, the release layer is formed form an aqueous precursor. The release layer can include a release agent. The release agent can include a silicone-based material, a fluorine-based material, a long-chain alkyl-based material, a fatty acid amide-based material, a polyvinyl alcohol-based material, a silica powder material, or any combination thereof. The fluorine-based material can include polytetrafluoroethylene (PTFE).

In one embodiment, the structural glazing tape can further include a barrier layer between the polymer foam and the release layer. The barrier layer functions to seal the second major surface from material forming the release layer. In one embodiment, the barrier layer has a thickness of at least 0.5 microns, such as at least about 1 micron, or at least about 2 microns. In another embodiment, the barrier layer has a thickness of not greater than about 25 microns, such as not greater than about 20 microns, or not greater than about 12 microns. The barrier layer can include a polyurethane, acrylic polymer, or wax.

In another embodiment, the release layer of the structural glazing tape is formed form a non-aqueous precursor. The precursor can include a release agent. The release agent includes a silicone-based material, a fluorine-based material, a long-chain alkyl-based material, a fatty acid amide-based material, a polyvinyl alcohol-based material, a silica powder material, or any combination thereof. In one embodiment, the fluorine-based material includes polytetrafluoroethylene (PTFE). In another embodiment, the non-aqueous precursor can include a non-aqueous solvent.

In one embodiment, the structural glazing tape can further include a polymer film between the polymer foam and the release layer. The polymer film has a thickness of between about 25 microns and about 508 microns. In another embodiment, the polymer film has a thickness of between about 76 microns and about 254 microns. In yet another embodiment, the polymer film has a thickness of at least about 127 microns. The polymer film can include a polyethylene, a polyurethane, a polyacrylate, a polymethacrylate, a polyester, or any combination thereof. In one particular embodiment, the polymer film includes a polyethylene terephthalate.

In one embodiment, a colorant layer can be present between the polymer foam and the polymer film. In another embodiment, the colorant layer can be present between the release layer and the polymer film. In yet a third embodiment, the colorant layer can be present between the polymer foam and the release layer.

The structural glazing tape can be in the form of a roll. The polymer foam of the structural glazing tape can have a thickness in a range of about 2 mm to about 12 mm. The release layer of the structural glazing tape can have a thickness in a range of about 0.003 microns to about 50 microns. The adhesive layer of the structural glazing tape can have a thickness in the range of about 0.01 mm to about 0.25 mm.

In one embodiment, the polymer foam can have a force to compress at 10% in a range of about 10 kPa to about 500 kPa. For example, the force to compress at 10% can be in the range of about 50 kPa to about 300 kPa.

In another embodiment, the structural glazing tape can have a width in a range of about 3 mm to about 50 mm. The width can be in the range of about 6 mm to about 25 mm. In one embodiment, the structural glazing tape can have an Unwinding Peel Strength in the range of about 0.01 lb/in to about 2.5 lb/in, such as in the range of about 0.1 lb/in to about 1.5 lb/in. In another embodiment, the structural glazing tape can have peel strength from a stainless steel panel in a range of about 1.0 lb/in to about 8.0 lb/in, such as in the range of about 2.0 lb/in to about 6.0 lb/in.

In another embodiment, a window module includes a metal frame having a first major surface, a glass panel having a second major surface, a structural glazing tape between the first major surface of the metal frame and the second major surface of the glass panel. The structural glazing tape includes a polymer foam tape having first and second major surfaces, an adhesive layer overlying the first major surface bonding the structural glazing tape to the structural frame, and a release layer overlying the second major surface and adjacent to the second major surface of the glass panel. More over the window module can include a cured sealant between the first major surface of the metal frame and the second major surface of the glass panel and adjacent to the structural glazing tape, the cured sealant bonding the metal frame to the glass panel. The cured sealant can include a silicone sealant.

In one embodiment of the window module, the glass panel includes one glass pane. In another embodiment, the glass panel can include an insulated glass including at least two glass panes. In another embodiment of the window module, the metal frame includes an extruded aluminum.

The structural glazing tape of the window can include any of the features described herein.

In another aspect, a method of preparing a window module can include providing a metal frame having a first major surface, applying a structural glazing tape to the first major surface of the metal frame. The structural glazing tape can include a polymer foam tape having first and second major surfaces, an adhesive layer overlying the first major surface for bonding the structural glazing tape to the structural frame, and a release layer overlying the second major surface. The method can further include positioning a glass panel on the structural glazing tape, filling a space with a curable sealant, wherein the space defined by the glass panel, the metal frame, and the structural glazing tape, and curing the sealant to bond the glass panel and the metal frame together.

The method can further include curing the sealant includes heating the sealant to a cure temperature. In another embodiment, curing the sealant can include reacting the sealant with moisture in the air. In yet another embodiment, curing the sealant can include directing electromagnetic radiation at the sealant. The electromagnetic radiation can include ultraviolet radiation.

EXAMPLES

Example 1

A glazing tape was prepared having a solvent-based release layer. A barrier layer dispersion was prepared from aliphatic polyurethane in water. The mixture was diluted with water to maintain a percentage of the solids between 10 wt % and 50 wt %, such as between 20 wt % and 40 wt % and in this particular example at 32 wt %. The barrier layer dispersion was applied onto a polymer foam by gravure cylinder. Wet deposits were between 1 micron and 40 microns in thickness, such as between 3 and 20 microns. The deposits were cured between 300° F. to 340° F. for 1 to 3 minutes, in this particular example for 2 minutes at 320° F. The barrier layer reached a thickness between 1 micron and 12 microns, such as between 2 microns and 6 microns, in this particular instance 3 microns.

A silicone release layer was applied onto the barrier layer. A silicone coating was prepard from methylhydrogenpolysiloxane silicone polymer, polydimethylsiloxane silicone polymer and a catalyst. The ingredients were mixed and diluted with a solvent such as methyl ethyl ketone, isopropyl alcohol, acetone, toluene, methyl isobutyl ketone, or any mixture thereof that the percent solids were between 0.25 wt % and 10 wt %, in this particular instance at 2.5 wt %. The silicone coating was applied onto the barrier layer by gravure cylinder and the wet deposit wer 10 microns in thickness. The wet deposit was cured between 300° F. to 340° F. for 1 to 3 minutes, in this particular example for 2 minutes at 320° F. The release coating reached a thickness between 0.03 microns and 1 micron, in this particular instance 0.25 microns.

Table 1 summarizes the peel strength in lb/in of the glazing tape having 4 wt % or 2 wt % of solids from a roll after 7 days or 24 hrs at indicated temperatures and their subsequent peel strength from stainless steel panels.

TABLE 1

| | 7 days at room temp | | 24 hrs at 180° F. | | 7 days at 120° F. | | 7 days at −30° F. | |
|---|---|---|---|---|---|---|---|---|
| | 4 wt % solids | 2 wt % solids | 4 wt % solids | 2 wt % solids | 4 wt % solids | 2 wt % solids | 4 wt % solids | 2 wt % solids |
| Release from Roll | 0.20 ± 0.02 | 0.41 ± 0.03 | 0.37 ± 0.02 | 0.86 ± 0.1 | 0.21 ± 0.02 | 0.61 ± 0.05 | 0.16 ± 0.02 | 0.37 ± 0.04 |
| Release from steel | 2.90 ± 0.08 | 3.78 ± 0.17 | 4.77 ± 0.52 | 4.16 ± 0.52 | 3.20 ± 0.24 | 3.65 ± 0.67 | 5.20 ± 0.63 | 3.57 ± 0.33 |

Example 2

A silicone release layer was applied onto the foam layer of a glazing tape. A silicone coating was prepared from methylhydrogenpolysiloxane silicone polymer, polydimethylsiloxane silicone polymer and a catalyst. The ingredients were mixed into an aqueous acrylic co-polymer emulsion including hexylene glycol. The aqueous silicone coating was applied onto the foam layer by gravure cylinder and the wet deposit were 10 microns in thickness. The wet deposit was cured between 300° F. to 340° F. for 1 to 3 minutes, in this particular example for 2 minutes at 320° F. The release coating reached a thickness between 1 micron and 12 microns, such as between 2 microns and 6 microns, in this particular instance 3 microns.

Table 2 summarizes the peel strength in lb./in of the glazing tape having aqueous silicone coating from a roll after 7 days at room temperature and its subsequent peel strength from stainless steel panels.

TABLE 2

| | 7 days at room temp |
|---|---|
| Release from Roll | 0.44 ± 0.02 |
| Release from steel | 5.22 ± 0.22 |

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of preparing a window module, comprising:
   providing a metal frame having a first major surface;
   applying a structural glazing tape to the first major surface of the metal frame, the structural glazing tape comprising:
   a polymer foam tape having first and second major surfaces;
   an adhesive layer overlying the first major surface for bonding the structural glazing tape to the structural frame; and
   a release layer overlying the second major surface;
   positioning a glass panel on the structural glazing tape such that, when assembled in the window module, the glass panel is adjacent the release layer;
   filling a space with a curable sealant, the space defined by the glass panel, the metal frame, and the structural glazing tape; and
   curing the sealant to bond the glass panel and the metal frame together.

2. The method of claim 1, wherein the glass panel comprises one glass pane.

3. The method of claim 1, wherein the glass panel comprises an insulated glass including at least two glass panes.

4. The method of claim 1, wherein the release layer of the structural glazing tape is adapted to releasably adhere to the glass panel such that the glass panel may be removed or shifted after an initial placement without destroying the structural glazing tape.

5. The method of claim 1, wherein curing the sealant includes heating the sealant to a cure temperature.

6. The method of claim 1, wherein curing the sealant includes reacting the sealant with moisture in the air.

7. The method of claim 1, wherein curing the sealant includes directing ultraviolet radiation at the sealant.

8. The method of claim 1, wherein the method further comprises disposing a barrier layer between the polymer foam and the release layer.

9. The method of claim 8, wherein the barrier layer is adapted to seal the second major surface from material forming the release layer.

10. The method of claim 8, wherein the barrier layer has a thickness of at least 0.5 microns.

11. The method of claim 8, wherein the release layer has a thickness of at least 0.5 microns and not greater than about 25 microns.

12. The method of claim 8, wherein the barrier layer includes a polyurethane, acrylic polymer, or wax.

13. The method of claim 8, wherein the release layer is formed form a non-aqueous precursor.

14. The method of claim 13, wherein the precursor includes a release agent.

15. The method of claim 14, wherein the release agent includes a silicone-based material, a fluorine-based material, a long-chain alkyl-based material, a fatty acid amide-based material, a polyvinyl alcohol-based material, a silica powder material, or any combination thereof.

16. The method of claim 15, wherein the fluorine-based material includes polytetrafluoroethylene (PTFE).

17. The method of claim 13, wherein the non-aqueous precursor includes a non-aqueous solvent.

18. The method of claim 1, wherein the release layer substantially prevents the structural glazing tape from bonding to itself, and wherein the structural glazing tape is free of a liner.

19. A method of preparing a window module, comprising:
providing a metal frame having a first major surface;
applying a structural glazing tape to the first major surface of the metal frame, the structural glazing tape comprising:
a tape having first and second major surfaces;
an adhesive layer overlying the first major surface for bonding the structural glazing tape to the structural frame; and
a release layer overlying the second major surface, wherein the release layer of the structural glazing tape is adapted to releasably adhere to the glass panel such that the glass panel may be removed or shifted after an initial placement without destroying the structural glazing tape;
positioning a glass panel on the structural glazing tape;
filling a space with a curable sealant, the space defined by the glass panel, the metal frame, and the structural glazing tape; and
curing the sealant to bond the glass panel and the metal frame together.

* * * * *